(12) United States Patent
Jung et al.

(10) Patent No.: US 7,416,796 B2
(45) Date of Patent: Aug. 26, 2008

(54) FUEL CELL WITH CAPACITOR ATTACHED TO THE FUEL CELL SEPARATOR PLATE

(75) Inventors: Hyun Chul Jung, Kyungki-do (KR); Choong Nam Park, Kyungki-do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 708 days.

(21) Appl. No.: 11/093,386

(22) Filed: Mar. 30, 2005

(65) Prior Publication Data
US 2005/0266278 A1   Dec. 1, 2005

(30) Foreign Application Priority Data
May 31, 2004   (KR) .................... 10-2004-0039173

(51) Int. Cl.
- *H01M 8/00* (2006.01)
- *H01M 8/10* (2006.01)
- *H01M 16/00* (2006.01)
- *H01M 8/24* (2006.01)

(52) U.S. Cl. .................. 429/9; 429/23; 429/32; 429/34

(58) Field of Classification Search .............. 429/7, 429/12, 34, 38, 9, 23, 30, 32; 320/101
See application file for complete search history.

(56) References Cited

U.S. PATENT DOCUMENTS

| | | | |
|---|---|---|---|
| 6,396,682 B1 | 5/2002 | Kim et al. | |
| 2004/0038087 A1* | 2/2004 | Shiue et al. | 429/7 |
| 2004/0081872 A1* | 4/2004 | Herman et al. | 429/26 |
| 2004/0209155 A1* | 10/2004 | Kosako et al. | 429/44 |
| 2006/0121328 A1* | 6/2006 | Liu et al. | 429/32 |
| 2006/0172158 A1* | 8/2006 | Min et al. | 429/9 |

FOREIGN PATENT DOCUMENTS

JP   2004-127758   4/2004

* cited by examiner

*Primary Examiner*—Gregg Cantelmo
(74) *Attorney, Agent, or Firm*—Volpe and Koenig, P.C.

(57) ABSTRACT

The present invention provides a capacitor-embedded fuel cell. The capacitor-embedded fuel cell comprises a membrane electrode assembly including a hydrogen ion exchange membrane consisting of a polymeric electrolyte, and a pair of gas diffusion electrodes disposed on upper and lower surfaces of the hydrogen ion exchange membrane, respectively, a pair of separator plates located on outer surfaces of the gas diffusion electrodes and having gas passages formed therein, respectively, and a polymer capacitor located on an outer surface of one of the pair of separator plates while being electrically connected in series to the separator plate.

10 Claims, 3 Drawing Sheets

FUEL CELL WITH CAPACITOR ATTACHED TO THE FUEL CELL SEPARATOR PLATE

RELATED APPLICATION

The present invention is based on, and claims priority from, Korean Application Number 2004-39173 filed on May 31, 2004, the disclosure of which is incorporated by reference herein in its entirety.

BACKGROUND OF THE INVENTION

1. Field of the Invention

The present invention relates to a capacitor-embedded fuel cell, and more particularly to a fuel cell, which incorporates a capacitor so as to ensure a high energy density.

2. Description of the Related Art

Generally, a fuel cell is a power source for converting energy generated by virtue of electrochemical reaction between a fuel and an oxidant into electric energy, and is the primary candidate for a new generation of energy supply systems due to its environmental friendliness and high energy efficiency.

In particular, since the fuel cell has advantages of ensuring continuous use for a long time and high capacitance, it is widely believed that fuel cells will replace conventional secondary batteries used in portable electronic devices, such as mobile phones, PDAs, and notebook computers as well as ultra small actuators.

FIG. 1 is a schematic view illustrating a polymer electrolyte membrane fuel cell, which is a representative example of a conventional fuel cell.

Referring to FIG. 1, the polymer electrolyte membrane fuel cell 10 comprises a membrane electrode assembly (MEA), which includes an ion exchange membrane 11 for selectively conveying hydrogen ions, and gas diffusion electrodes 14 and 17 disposed at both sides of the ion exchange membrane 11.

The ion exchange membrane 11 consists of a solid polymeric electrolyte having a thickness of about 50~200 µm. The gas diffusion electrodes 14 and 17 comprise catalyst layers 12 and 15, each of which is in intimate contact with the ion exchange membrane 11 and consists of carbon powders bearing a platinum-based metallic catalyst, and gas diffusion layers 13 and 16, each of which consists of a porous carbon support located on an outer surface of the catalyst layer 12 or 15. The gas diffusion electrodes 14 and 17 are provided as an anode and cathode, respectively.

The polymer electrolyte membrane fuel cell 10 further comprises separator plates 18a and 18b located at outer surfaces of the gas diffusion electrodes 14 and 17, respectively. The separator plates 18a and 18b serve to hold the membrane electrode assembly (MEA), and have passages to supply a reactant gas to the gas diffusion electrodes 14 and 17 while conveying by-products caused by reaction of the reactant gas to the outside. Although FIG. 1 shows a single MEA, the fuel cell is realized in practice as a stacked assembly having a plurality of MEAs stacked therein, and in this case, the separator plates 18a and 18b serve to electrically connect adjacent MEAs in series.

When the fuel cell 10 shown in FIG. 1 is operated, hydrogen or organic compounds such as methanol and ethanol are supplied from a separate fuel supplier (not shown) to the catalyst layer 12 through the gas diffusion layer 13 at the anode side, and oxygen or air is supplied to the catalyst layer 15 through the gas diffusion layer 16 at the cathode side, so that electrochemical reaction thereof occurs to generate electric energy together with the by-products, such as carbon dioxide, hydrogen and remaining gas, which will be discharged to the outside.

As such, since the fuel cell can be used for a long time under the condition in which the fuel is continuously supplied into the fuel cell, and since the fuel for the fuel cell is free from danger as well as inexpensive, it can be available for an ideal portable cell.

However, although the fuel cell as described above is appropriate to supply lower electric current for a long time, the fuel cell has a drawback of weakness for variation in load. This is caused by a relatively low output density thereof, and thus, when a great amount of electric current must be supplied within a short time, such as when booting a notebook computer, it is necessary to use a secondary battery or an additional capacitor along with the fuel cell.

For this purpose, a fuel cell system controller comprising the secondary battery or the capacitor has been conventionally used as an independent power source together with the fuel cell. However, in this case, there are problems in that an overall driving circuit of the fuel cell is complicated when adopting the secondary battery or the capacitor, thereby causing increase in manufacturing costs and size of the fuel cell.

SUMMARY OF THE INVENTION

The present invention has been made to solve the above problems, and it is an object of the present invention to provide a new type of fuel cell, which comprises a polymer capacitor attached to one of separator plates of the fuel cell having a stacked construction so as to be connected in series to this separator plate, thereby permitting a great amount of electric current to be supplied therefrom while satisfying requirements for miniaturization and weight reduction.

In accordance with one aspect of the present invention, the above and other objects can be accomplished by the provision of a capacitor-embedded fuel cell, comprising: a membrane electrode assembly including a hydrogen ion exchange membrane consisting of a polymeric electrolyte, and a pair of gas diffusion electrodes disposed on upper and lower surfaces of the hydrogen ion exchange membrane, respectively; a pair of separator plates located on outer surfaces of the gas diffusion electrodes and having gas passages formed therein, respectively; and a polymer capacitor located on an outer surface of one of the pair of separator plates while being electrically connected in series to the separator plate.

The capacitor may comprise a polymer layer permitting hydrogen exchange therethrough, similar to the hydrogen ion exchange membrane. According to the embodiment of the invention, the polymer layer may consist of the same material as that of the hydrogen ion exchange membrane.

The capacitor may comprise a polymer layer and electrodes formed on upper and lower surfaces of the polymer layer, and each of the electrodes may be formed in a state of being dispersed from the upper or lower surface of the polymer layer into the polymer layer so as to increase a contact area between the electrode and the polymer layer. The electrodes may be formed of Au.

The polymer layer may comprise a plurality of pores, each being filled with a high dielectric constant electrolyte.

The polymer capacitor may be realized in the form of a package having an electrolyte contained therein.

The fuel cell may have a plurality of membrane electrode assemblies stacked therein, and in this case, the capacitor may be mounted on an exposed surface of either the uppermost separator plate or the lowermost separator plate.

BRIEF DESCRIPTION OF THE DRAWINGS

The above and other objects, features and other advantages of the present invention will be more clearly understood from the following detailed description taken in conjunction with the accompanying drawing:

FIG. 2b is a cross-sectional view of a polymer capacitor applicable to the fuel cell of FIG. 2a.

DESCRIPTION OF THE PREFERRED EMBODIMENTS

Preferred embodiments of the present invention will now be described in detail with reference to the accompanying drawings.

Figure 2A:
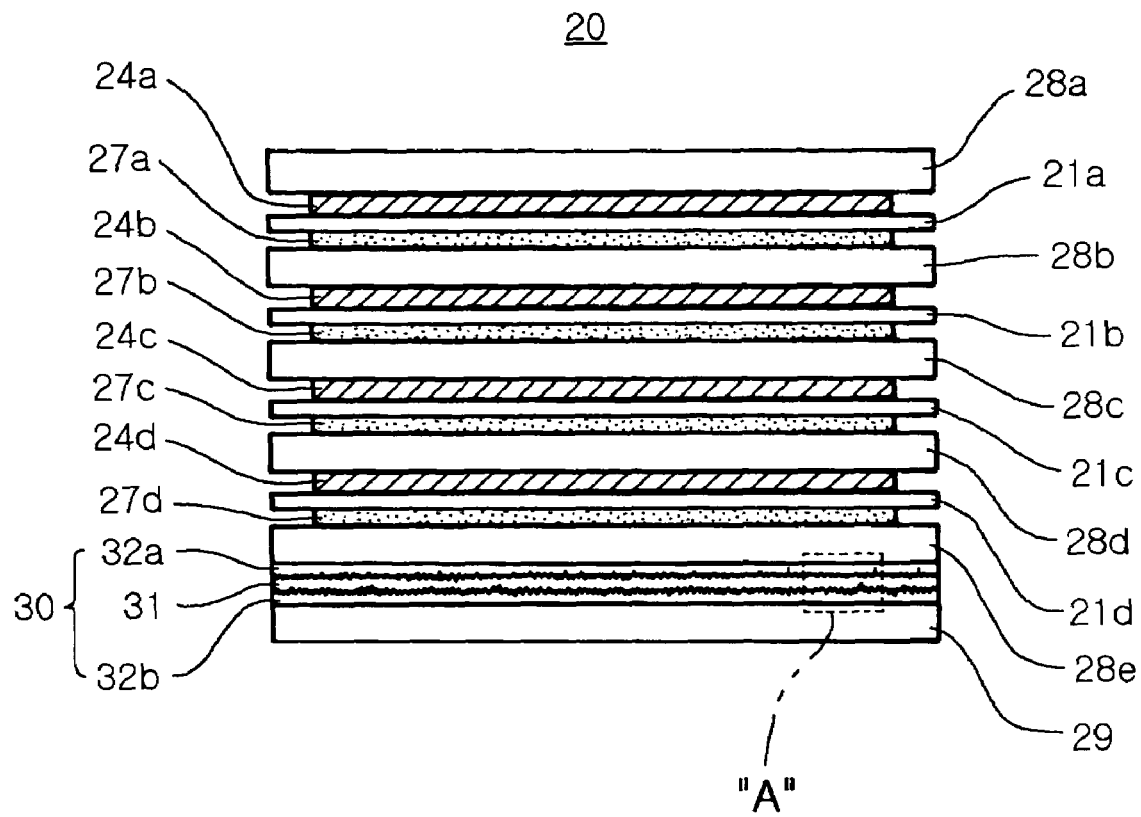
FIG. 2a is a schematic view of a capacitor-embedded fuel cell in accordance with a preferred embodiment of the present invention.

FIG. 2a is a schematic view of a capacitor-embedded fuel cell in accordance with a preferred embodiment of the present invention.

Referring to FIG. 2a, a laminated fuel cell 20 is schematically illustrated as an example of the fuel cell applicable to the invention. The fuel cell 20 comprises four membrane electrode assemblies (MEA), each of which includes an ion exchange membrane 21a, 21b, 21c or 21d, and a pair of gas diffusion electrodes 24a and 27a; 24b and 27b; 24c and 27c; 24d and 27d located on upper and lower surfaces of the ion exchange membrane 21a, 21b, 21c or 21d, respectively. The membrane electrode assemblies are connected in series via separator plates 28a, 28b, 28d and 28e disposed on outer surfaces of the membrane electrode assemblies, respectively.

Figure 1:
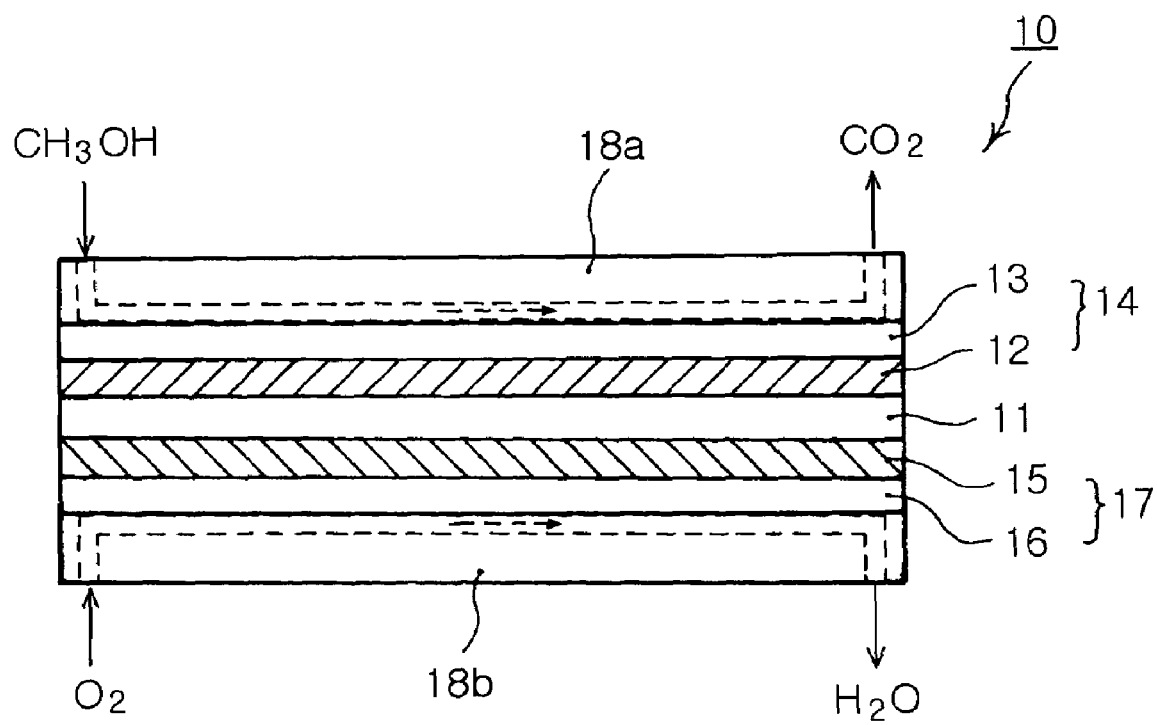
FIG. 1 is a schematic view of a conventional fuel cell.

As with the gas diffusion electrodes 14 and 17 described above in FIG. 1, the gas diffusion electrodes 24a and 27a; 24b and 27b; 24c and 27c; 24d and 27d are disposed on the upper and lower surfaces of the ion exchange membrane 21a, 21b, 21c or 21d, respectively, and comprise a catalyst layer, which consists of carbon powders bearing a platinum-based metallic catalyst and a gas diffusion layer consisting of a porous carbon support.

The fuel cell 20 according to the embodiment comprises a polymer capacitor 30 attached to the lowermost separator plate 28e. Preferably, the fuel cell 20 may further comprise a protecting plate 29 for protecting the polymer capacitor 30. The polymer capacitor 30 is connected in series to the fuel cell having a stacked construction through the lowermost separator plate 28e, and can accumulate electricity generated in the fuel cell.

The polymer capacitor 30 of the invention has a plate shape, and comprises a polymer layer 31 and electrodes 32a and 32b disposed on upper and lower surfaces of the polymer layer 31. The polymer layer 31 is preferably made of a material which permits hydrogen exchange, and may be made of the same polymeric material as a solid electrolyte constituting the ion exchange membranes 21a to 21d so long as an implementation of the invention can be realized. The electrodes 32a and 32b may be formed of Au, but the present invention is not limited to this material.

Figure 2B:
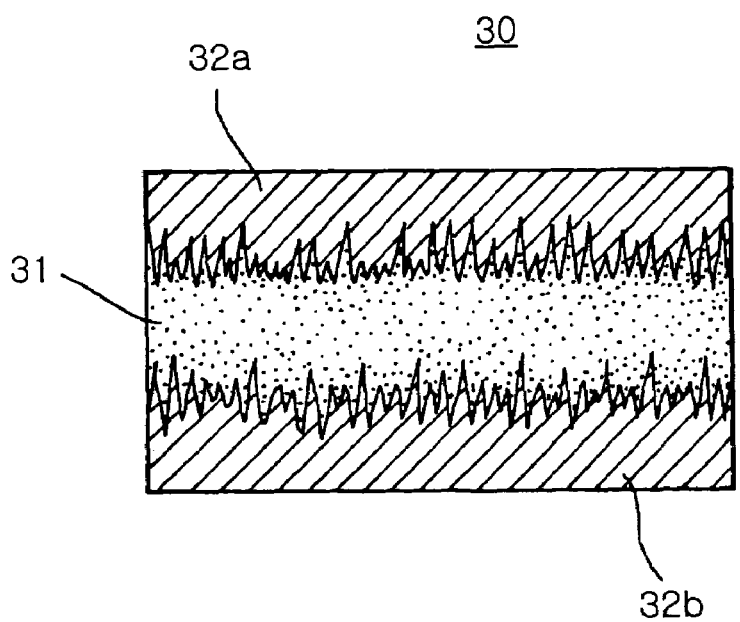

FIG. 2b is a cross-sectional view of a polymer capacitor 30 applicable in practice to the fuel cell of FIG. 2a.

As shown in FIG. 2b, the electrodes 32a and 32b of the polymer capacitor 30 are formed of Au in a state of being dispersed from both surfaces of the polymer layer 31 into the polymer layer 31. Such a method of forming the dispersed electrodes 32a and 32b is provided for the purpose of allowing miniaturization and weight reduction of the fuel cell. That is, when manufacturing the fuel cell, it is desirable that the electrodes are formed to have an area similar to that of the fuel cell stack and to be as thin as possible, and under this condition, a greater area of the electrodes is required in order to secure high capacitance with a limited size of the electrodes, which is realized by the construction as described above.

Although an example of the stacked fuel cell is illustrated as comprising the plurality of MEAs in FIG. 2a, the present invention is not limited to this construction. Alternatively, the fuel cell may comprise a single MEA, and in this case, the polymer capacitor 30 may be attached to the outer surface of the separator plate at one side of the fuel cell and used in a similar manner to the case having the plurality of MEAs.

As described with reference to FIG. 2b, the polymer capacitor of the invention may be realized in various shapes in order to ensure sufficient capacitance with the limited size.

For example, as shown in FIG. 2b, the electrodes may be formed in the state of being dispersed into the polymer layer in order to increase the area of the electrodes, and alternatively, other preferred constructions of polymer capacitor may be employed in order to ensure sufficient capacitance by increasing the dielectric constant of the polymer layer.

Figure 3A:
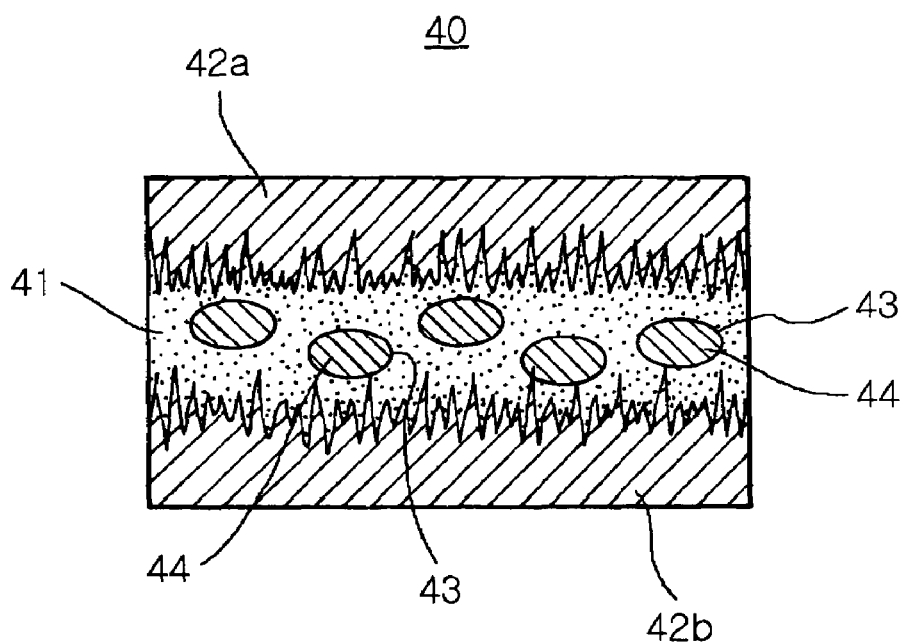
FIGS. 3a and 3b are schematic views of other polymer capacitors applicable to the fuel cell of the invention, respectively.
Figure 3B:
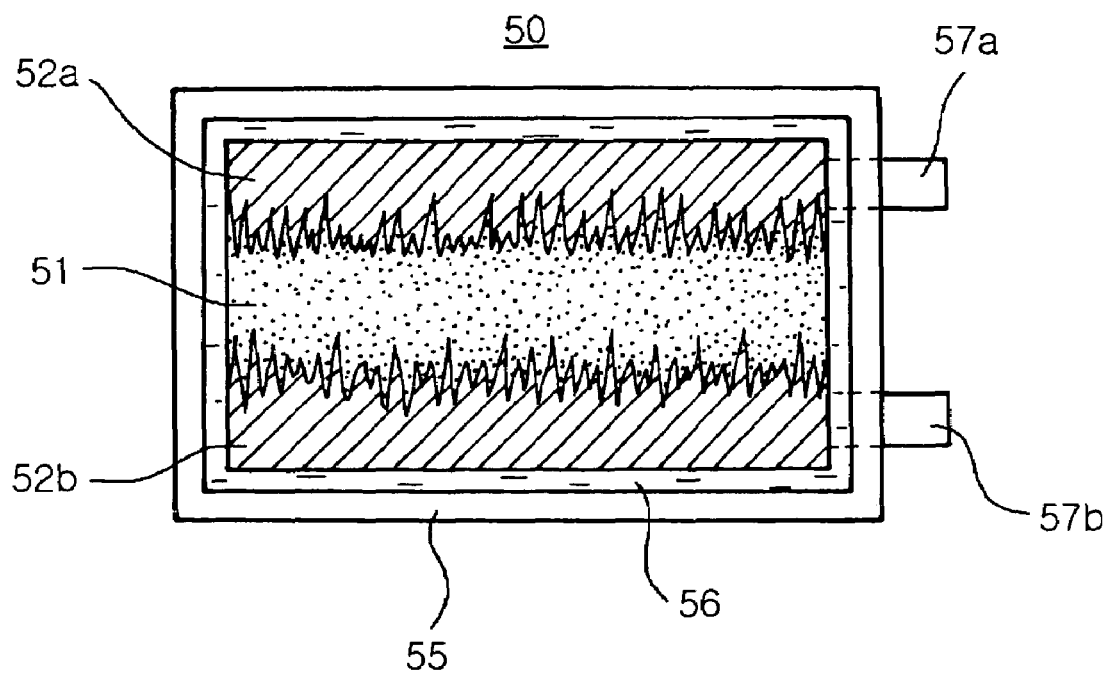

FIGS. 3a and 3b are schematic views of other polymer capacitors applicable to the fuel cell of the invention, respectively.

Referring to FIG. 3a, a polymer capacitor 40 comprises a polymer layer 41, and electrodes 42a and 42b formed in a state of being dispersed from upper and lower surfaces of the polymer layer 41 into the polymer layer 41. In order to secure sufficient electrostatic capacitance by increasing a dielectric constant, the polymer layer 41 is formed therein with a plurality of pores 43, each of which has an electrolyte 44 of a high dielectric constant filled therein. As a result, the entire dielectric constant of the polymer layer 41 is increased, so that even if the polymer layer 41 is realized with a limited size so as to be coupled to the fuel cell, electrostatic capacitance for supplying the great amount of electric current can be secured.

Alternatively, as shown in FIG. 3b, the polymer capacitor may be provided in the form of a package 50. The package 50 for the polymer capacitor comprises a package body 55 having a predetermined electrolyte 56 filled therein. The package 50 is constructed such that the polymer capacitor comprising a polymer layer 51 and electrodes 52a and 52b formed on both sides of the polymer layer 51 is embedded in the package body 55. The electrodes 52a and 52b of the polymer capacitor may be connected to the fuel cell stack and an outer controller through outer electrodes 57a and 57b provided at one side of the package body 55.

As apparent from the above description, the fuel cell of the invention comprises the polymer capacitor which is attached to the separator plate at one side of the fuel cell stack so as to be electrically connected in series to this separator plate, thereby permitting the great amount of electric current to be supplied therefrom while satisfying requirements for miniaturization and weight reduction of the fuel cell.

It should be understood that the embodiments and the accompanying drawings have been described for illustrative purposes and the present invention is limited by the following claims. Further, those skilled in the art will appreciate that various modifications, additions and substitutions are allowed without departing from the scope and spirit of the invention as set forth in the accompanying claims.

What is claimed is:

1. A capacitor-embedded fuel cell, comprising:
   a membrane electrode assembly(MEA) including a hydrogen ion exchange membrane consisting of a polymeric electrolyte, and a pair of gas diffusion electrodes disposed on upper and lower surfaces of the hydrogen ion exchange membrane, respectively;
   a pair of separator plates located on outer surfaces of the gas diffusion electrodes and having gas passages formed therein, respectively; and
   a polymer capacitor located on an outer surface of at least one of the pair of separator plates while being electrically connected in series to the separator plate.

2. The fuel cell as set forth in claim 1, further comprising:
   a polymer layer permitting hydrogen exchange therethrough.

3. The fuel cell as set forth in claim 2, wherein the polymer layer is made of the same material as that of the hydrogen ion exchange membrane.

4. The fuel cell as set forth in claim 1, wherein the capacitor comprises a polymer layer, and electrodes respectively formed on upper and lower surfaces of the polymer layer, each of the electrodes being formed in a state of being dispersed from the upper or lower surface of the polymer layer into the polymer layer so as to increase a contact area between the electrode and the polymer layer.

5. The fuel cell as set forth in claim 1, wherein the polymer layer comprises a plurality of pores, each being filled with a high dielectric constant electrolyte.

6. The fuel cell as set forth in claim 1, wherein the polymer capacitor is realized in the form of a package having an electrolyte contained therein.

7. The fuel cell as set forth in claim 1, wherein the fuel cell has a plurality of membrane electrode assemblies stacked therein, and the capacitor is mounted on an exposed surface of either the uppermost separator plate or the lowermost separator plate.

8. The fuel cell as set forth in claim 2, wherein the polymer layer comprises a plurality of pores, each being filled with a high dielectric constant electrolyte.

9. The fuel cell as set forth in claim 3, wherein the polymer layer comprises a plurality of pores, each being filled with a high dielectric constant electrolyte.

10. The fuel cell as set forth in claim 4, wherein the polymer layer comprises a plurality of pores, each being filled with a high dielectric constant electrolyte.

* * * * *